US008224070B2

(12) United States Patent
Umemura et al.

(10) Patent No.: US 8,224,070 B2
(45) Date of Patent: Jul. 17, 2012

(54) THREE-DIMENSIONAL MEASURING DEVICE

(75) Inventors: Nobuyuki Umemura, Aichi (JP); Hiroyuki Ishigaki, Aichi (JP)

(73) Assignee: CKD Corporation, Komaki-shi (JP)

( * ) Notice: Subject to any disclaimer, the term of this patent is extended or adjusted under 35 U.S.C. 154(b) by 413 days.

(21) Appl. No.: 12/688,552

(22) Filed: Jan. 15, 2010

(65) Prior Publication Data

US 2010/0183194 A1   Jul. 22, 2010

(30) Foreign Application Priority Data

Jan. 20, 2009 (JP) .................................. 2009-10076

(51) Int. Cl.
*G06K 9/00* (2006.01)
*G06K 9/66* (2006.01)

(52) U.S. Cl. ......... 382/154; 382/144; 382/145; 382/191

(58) Field of Classification Search .................. 382/154, 382/181, 190, 191, 141–152, 299, 300
See application file for complete search history.

(56) References Cited

U.S. PATENT DOCUMENTS
7,641,957 B2 * 1/2010 Robinson et al. ............. 428/141

FOREIGN PATENT DOCUMENTS
JP   06-006794 A    1/1994
JP   06-066527 A    3/1994
JP   2005-098884 A  4/2005

OTHER PUBLICATIONS

Office Action issued in Japanese Patent Application No. 2009-010076 mailed Mar. 1, 2011, with English translation thereof, 4 pages.
Office Action in Japanese Patent Application No. 2009-010076 mailed Dec. 14, 2010, with English translation thereof (6 pages).

* cited by examiner

*Primary Examiner* — Brian Le
(74) *Attorney, Agent, or Firm* — Osha Liang LLP

(57) ABSTRACT

A three-dimensional measuring device includes an irradiation device configured to irradiate and switch among a multiplicity of light patterns having different periods and having a striped light intensity distribution on at least a measurement object, a camera having an imaging element capable of imaging reflected light from the measurement object irradiated by the light pattern, a rack configured to cause relative change in positional relationship between the imaging element and the measurement object, and a control device configured to perform three-dimensional measurements based on image data imaged by the camera. The control device performs the three-dimensional measurements by performing a phase shift method calculation of height data as a first height data for each pixel unit of image data based on a multiply phase-shifted image data obtained by irradiating on a first position a multiply phase-shifted first light pattern having a first period.

15 Claims, 13 Drawing Sheets

| No. 1 height resolution, 2 μm | No. 2 height resolution, 4 μm | Line order | No. 1 height considering line order, 2 μm resolution |
|---|---|---|---|
| 10±1 | 20±2 | second order | 20±1 |
| 8±1 |  |  | 18±1 |
| 6±1 | 16±2 |  | 16±1 |
| 4±1 |  |  | 14±1 |
| 2±1 | 12±2 |  | 12±1 |
| 0±1 |  |  | 10±1 |
| 10±1 |  | first order |  |
| 8±1 | 8±2 |  | 8±1 |
| 6±1 |  |  | 6±1 |
| 4±1 | 4±2 |  | 4±1 |
| 2±1 |  |  | 2±1 |
| 0±1 | 0±2 |  | 0±1 |

| No. 1 height resolution, 2 μm | No. 2 height resolution, 4 μm | Line order | No. 1 height considering line order, 2 μm resolution |
|---|---|---|---|
| 10±1 | 20±2 | second order | 20±1 |
| 8±1 | | | 18±1 |
| 6±1 | 16±2 | | 16±1 |
| 4±1 | | | 14±1 |
| 2±1 | 12±2 | | 12±1 |
| 0±1 | | | 10±1 |
| 10±1 | 8±2 | first order | 8±1 |
| 8±1 | | | |
| 6±1 | | | 6±1 |
| 4±1 | 4±2 | | 4±1 |
| 2±1 | | | 2±1 |
| 0±1 | 0±2 | | 0±1 |

FIG. 3

| $A_1$ | $A_2$ | $A_3$ | $A_4$ |
|---|---|---|---|
| $A_5$ | $A_6$ | $A_7$ | $A_8$ |
| $A_9$ | $A_{10}$ | $A_{11}$ | $A_{12}$ |
| $A_{13}$ | $A_{14}$ | $A_{15}$ | $A_{16}$ |

FIG. 4(a)

| $B_1$ | $B_2$ | $B_3$ | $B_4$ |
|---|---|---|---|
| $B_5$ | $B_6$ | $B_7$ | $B_8$ |
| $B_9$ | $B_{10}$ | $B_{11}$ | $B_{12}$ |
| $B_{13}$ | $B_{14}$ | $B_{15}$ | $B_{16}$ |

| Actual value | No. 1 height | No. 2 height | No. 1 height considering line order | Corrected no. 2 height | Interpolation | Maximum error |
|---|---|---|---|---|---|---|
| 0 | 0 | 0 | 0 | 0 | 0 | 0 |
| 1 | 0 | 0 | 0 | 0 | 0 | -1 |
|   | 2 | 0 | 2 | 2 | 1 | 1 |
| 2 | 2 | 0 | 2 | 2 | 1 | -1 |
|   | 2 | 4 | 2 | 2 | 3 | 1 |
| 3 | 2 | 4 | 2 | 2 | 3 | -1 |
|   | 4 | 4 | 4 | 4 | 4 | 1 |
| 4 | 4 | 4 | 4 | 4 | 4 | 0 |
| 5 | 4 | 4 | 4 | 4 | 4 | -1 |
|   | 6 | 4 | 6 | 6 | 5 | 1 |
| 6 | 6 | 4 | 6 | 6 | 5 | -1 |
|   | 6 | 8 | 6 | 6 | 7 | 1 |
| 7 | 6 | 8 | 6 | 6 | 7 | -1 |
|   | 8 | 8 | 8 | 8 | 8 | 1 |
| 8 | 8 | 8 | 8 | 8 | 8 | 0 |
| 9 | 8 | 8 | 8 | 8 | 8 | -1 |
|   | 10 | 8 | 10 | 10 | 9 | 1 |
| 10 | 10 | 8 | 10 | 10 | 9 | -1 |
|   | 0 | 12 | 10 | 10 | 11 | 1 |
| 11 | 0 | 12 | 10 | 10 | 11 | -1 |
|   | 2 | 12 | 12 | 12 | 12 | 1 |
| 12 | 2 | 12 | 12 | 12 | 12 | 0 |
| 13 | 2 | 12 | 12 | 12 | 12 | -1 |
|   | 4 | 12 | 14 | 14 | 13 | 1 |
| 14 | 4 | 12 | 14 | 14 | 13 | -1 |
|   | 4 | 16 | 14 | 14 | 15 | 1 |
| 15 | 4 | 16 | 14 | 14 | 15 | -1 |
|   | 6 | 16 | 16 | 16 | 16 | 1 |
| 16 | 6 | 16 | 16 | 16 | 16 | 0 |
| 17 | 6 | 16 | 16 | 16 | 16 | -1 |
|   | 8 | 16 | 18 | 18 | 17 | 1 |
| 18 | 8 | 16 | 18 | 18 | 17 | -1 |
|   | 8 | 20 | 18 | 18 | 19 | 1 |
| 19 | 8 | 20 | 18 | 18 | 19 | -1 |
|   | 10 | 20 | 20 | 20 | 20 | 1 |
| 20 | 10 | 20 | 20 | 20 | 20 | 0 |

| Actual value | No. 1 height | No. 2 height | No. 3 height | No. 4 height | Line order considering no. 1 and no. 3 heights | Line order considering no. 2 and no. 4 heights | Maximum error |
|---|---|---|---|---|---|---|---|
| 0 | 0 | 0 | 0 | 0 | 0 | 0 | 0 |
| 1 | 0 | 0 | 0 | 0 | 0 | 0 | -1 |
|  | 2 | 0 | 2 | 0 | 2 | 2 | 1 |
| 2 | 2 | 0 | 2 | 0 | 2 | 2 | -1 |
|  | 2 | 4 | 2 | 4 | 2 | 2 | 1 |
| 3 | 2 | 4 | 2 | 4 | 2 | 2 | -1 |
|  | 4 | 4 | 4 | 4 | 4 | 4 | 1 |
| 4 | 4 | 4 | 4 | 4 | 4 | 4 | 0 |
| 5 | 4 | 4 | 4 | 4 | 4 | 4 | -1 |
|  | 6 | 4 | 6 | 4 | 6 | 6 | 1 |
| 6 | 6 | 4 | 6 | 4 | 6 | 6 | -1 |
|  | 6 | 8 | 6 | 8 | 6 | 6 | 1 |
| 7 | 6 | 8 | 6 | 8 | 6 | 6 | -1 |
|  | 8 | 8 | 8 | 8 | 8 | 8 | 1 |
| 8 | 8 | 8 | 8 | 8 | 8 | 8 | 0 |
| 9 | 8 | 8 | 8 | 8 | 8 | 8 | -1 |
|  | 10 | 8 | 10 | 8 | 10 | 10 | 1 |
| 10 | 10 | 8 | 10 | 8 | 10 | 10 | -1 |
|  | 0 | 12 | 0 | 12 | 10 | 10 | 1 |
| 11 | 0 | 12 | 0 | 12 | 10 | 10 | -1 |
|  | 2 | 12 | 2 | 12 | 12 | 12 | 1 |
| 12 | 2 | 12 | 2 | 12 | 12 | 12 | 0 |
| 13 | 2 | 12 | 2 | 12 | 12 | 12 | -1 |
|  | 4 | 12 | 4 | 12 | 14 | 14 | 1 |
| 14 | 4 | 12 | 4 | 12 | 14 | 14 | -1 |
|  | 4 | 16 | 4 | 16 | 14 | 14 | 1 |
| 15 | 4 | 16 | 4 | 16 | 14 | 14 | -1 |
|  | 6 | 16 | 6 | 16 | 16 | 16 | 1 |
| 16 | 6 | 16 | 6 | 16 | 16 | 16 | 0 |
| 17 | 6 | 16 | 6 | 16 | 16 | 16 | -1 |
|  | 8 | 16 | 8 | 16 | 18 | 18 | 1 |
| 18 | 8 | 16 | 8 | 16 | 18 | 18 | -1 |
|  | 8 | 20 | 8 | 20 | 18 | 18 | 1 |
| 19 | 8 | 20 | 8 | 20 | 18 | 18 | -1 |
|  | 10 | 20 | 10 | 20 | 20 | 20 | 1 |
| 20 | 10 | 20 | 10 | 20 | 20 | 20 | 0 |

FIG. 13

THREE-DIMENSIONAL MEASURING DEVICE

CROSS-REFERENCE TO RELATED APPLICATIONS

This Application claims priority to Japanese Patent Application No. 2009-10076 filed on Jan. 14, 2009 in Japan.

BACKGROUND OF INVENTION

1. Field of the Invention

The present invention relates to a three-dimensional measuring device.

2. Background Art

When an electronic component is mounted on a printed circuit board, a cream solder is generally first printed on a specific electrode pattern disposed on the printed circuit board. Adhesivity of this cream solder is then used to temporarily fix the electronic component on the printed circuit board. Thereafter, the above-described printed circuit board is conveyed to a reflow furnace, and soldering is performed by a routine reflow process. Recently, it has become necessary to perform an inspection of the printed state of the cream solder at a stage prior to conveyance to the reflow furnace, and three-dimensional measuring devices have been used for such inspection.

Various types of so-called non-contact type three-dimensional measuring devices using light have been proposed in recent years. Technology that relates, for example, to three-dimensional measuring devices utilizing the phase shift method has been proposed.

In a three-dimensional measuring device using this phase shift method, an irradiation means combining a light source and a sine wave pattern filter is used to illuminate a measurement object (such as a substrate or printed circuit board) using a light pattern having a sinusoidal (stripe shaped) light intensity distribution. Thereafter, points on the substrate are measured using an imaging means disposed directly above the substrate. A CCD camera having a lens and imaging elements may be used as the imaging means. In this case, intensity I of light at a point P on the image is given by the following equation:

$$I = e + f \times \cos(\phi)$$

(within the formula, e=direct current optical noise (offset component), f=sine wave contrast (reflectivity), and $\phi$=phase imparted by unevenness of the object).

At this time, the pattern light is moved so that the phase changes, for example, in 4 stages (e.g., $\phi+0$, $\phi+\pi/2$, $\phi+\pi$, and $\phi+3\pi/2$), images having intensity distributions corresponding to these phase shift changes (e.g., I0, I1, I2, and I3, respectively) are captured, and the modulation component $\alpha$ is determined based on the formula below.

$$\alpha = \arctan\{(I3-I1)/(I0-I2)\}$$

This modulation component a can be used to determine the three-dimensional coordinates (X, Y, Z) at a measurement object point P on the measurement object (e.g., the cream solder), and these three-dimensional coordinates can be used to measure the three-dimensional shape of the measurement object and particularly to measure the height of the measurement object.

However, actual measurement objects include both tall measurement objects and short measurement objects. For example, in the case of cream solders, there are both thin film-shaped cream solders and protruding cream solders which forms a truncated cone shape. If the gaps between the lines of the irradiated light pattern are widened in order to adjust to the maximum height among such measurement objects, resolution ability becomes poor, and there is concern that measurement accuracy will worsen. On the other hand, although improving accuracy may be possible by narrowing the gaps between the lines, the height range capable of measurement would become insufficiently small, e.g., such narrow gaps would result in errors due differences in line orders.

Thus, for example, technology has been proposed for obtaining image data of higher resolution by performing the first imaging and then causing mutual displacement between the imaging element and the measurement object by one half pixel pitch of the imaging element before performing the second imaging (e.g., refer to Patent Citation 1).

Further, in order to solve the problem of the measurement-capable height range becoming too narrow, technology has also been proposed which combines a light pattern of a short period (line pitch) and a light pattern of a long period (e.g., refer to Patent Citation 2).

PATENT CITATION

[Patent Citation 1] Japanese Unexamined Laid-open Patent Application No. H6-6794

[Patent Citation 2] Japanese Unexamined Laid-open Patent Application No. 2005-98884

However, if the above-described conventional technologies are combined in an attempt to widen the measurement-capable height range and increase horizontal resolution without lowering resolution in the height direction, for example, a total of four measurements measurement must be performed: a first measurement using pattern light of a short period at a first position, a second measurement using pattern light of a long period at a second position, a measurement using pattern light of the short period at a position displaced from the first position by a half pixel pitch, and a measurement using pattern light of the long period at a position displaced from the second position by a half pixel pitch.

In the conventional three-dimensional measurement using the phase shift method in the above-described manner, when the phase is changed in four stages, for example, four kinds of image data having intensity distributions corresponding to each stage must be acquired. That is to say, imaging must be performed each time the phase is changed, and imaging must be performed four times for a single measurement position. Therefore, when respective measurements are performed by two types of light patterns in the above-described manner at two locations, the total count of imaging operations becomes 16.

Thus there is concern that simply combining the above-described conventional technologies in order to increase the height range capable of measurement and to increase the horizontal resolution would result in an increase in overall measurement time due to the increase in the number of imaging operations and would thus lower measurement efficiency.

The above-described problem is not limited to measurement of height of cream solder and the like printed on a printed circuit board, and this problem is inherent in other fields that use three-dimensional measuring devices.

SUMMARY OF INVENTION

In consideration of the above-described circumstances, one object of the present invention is to provide a three-dimensional measuring device that is capable of higher precision measurement during a shorter time interval during performance of three-dimensional measurement using the phase shift method. Other advantages of embodiments of the present invention will be set forth in part in the description and drawings that follow.

A first aspect of the present invention is a three-dimensional measuring device including: an irradiation device configured to irradiate and switch among a multiplicity of light patterns having different periods and having a striped light intensity distribution on at least a measurement object; a camera having an imaging element capable of imaging reflected light from the measurement object irradiated by the light pattern; a rack configured to cause relative change in positional relationship between the imaging element and the measurement object; and a control device configured to perform three-dimensional measurements based on image data imaged by the camera, wherein the control device performs the three-dimensional measurements by: performing a phase shift method calculation of height data as a first height data for each pixel unit of image data based on a multiply phase-shifted image data obtained by irradiating on a first position a multiply phase-shifted first light pattern having a first period; performing a phase shift method calculation of height data as a second height data for each pixel unit of image data based on a multiply phase-shifted image data obtained by irradiating on a second position a multiply phase-shifted second light pattern having a second period, the second period being longer than the first period, and the second position being displaced by a half pixel pitch toward a predetermined direction from the first position; and replacing the first height data, after identifying a line order of each of the first height data based on the second height data, with a value that took into account the identified line order.

According to the above-described first aspect, the first height data is calculated by the phase shift method for each pixel unit of image data based on a multiplicity of image data obtained by irradiating a first light pattern having a first period on a first position. Furthermore, second height data for each pixel unit of image data are calculated by the phase shift method based on multiple image data obtained by irradiating the second light pattern of the second period, which is longer than the first period, on the second position, which is displaced from the first position by a half pixel pitch in a predetermined direction. By combining these data (including post-processing image data such as measurement data arranged as height data for each coordinate, and the like), it becomes possible to generate image data at a high resolution that exceeds the resolution of the imaging element, and three-dimensional measurement can be performed with higher accuracy.

Further, according to the present aspect, based on the second height data obtained using the second light pattern having a long period, the line order (fringe corresponding to the measurement object component in the phase shift method) of each first height data is determined. Then, the value of the first height data is replaced with a corrected value that takes into account this line order. That is to say, the ability to increase the height range capable of measurement, which is an advantage of using the second light pattern having a long period, and the ability to attain highly accurate measurements at high resolution, which is an advantage of using the first light pattern having a short period, can both be obtained. As a result, an increase in the height range capable of measurement is possible while increasing horizontal resolution and without lowering resolution in the height direction.

In the present aspect, each measurement performed using the first position or the second position only uses the first light pattern or the second light pattern. That is to say, there is no need for performing measurements using light patterns of two types each for two locations, and, therefore, the number of imaging operations and the increase of overall measurement time can be reduced. This makes it possible to obtain measurements of higher accuracy over a shorter time interval.

Because the above configuration can be implemented with image processing, which is software-based processing, it becomes possible to reduce manufacturing costs without modifying hardware.

A second aspect of the present invention is the three-dimensional measuring device as set forth in the first aspect, wherein the second position is a position displaced obliquely a half pixel pitch from the first position.

According to the above-described aspect, it is possible to obtain image data having four times the resolution of the imaging element with two measurements: one at the first position and another at the second position. Also, the term "position displaced obliquely at a half pixel pitch" refers to a position displaced by a half pixel unit in a direction diagonal (oblique direction relative to the direction of arrays) to the rectangular shape of the pixels, which are arranged in a lattice-shaped manner for the image data.

A third aspect of the present invention is the three-dimensional measuring device as set forth in the second aspect, wherein the control device further interpolates a missing data part based on the first height data that took into account at least the line order at the periphery of the missing data part.

Missing parts arise in the data when the first height data and the second height data are combined to generate the high resolution data, but, according to the third aspect of the present invention, such a deficiency can be prevented.

A forth aspect of the present invention is the three-dimensional measuring device as set forth in any one of the first aspect through the third aspect, wherein the control device further revises the value of the second height data based on the first height data that took into account the line order.

According to the forth aspect of the present invention, the value of the second height data (the actually measured data) obtained by the second calculation means can be revised based on the this first height data, which took into account the line order, and this value can be set closer to the real value of the second height data.

A fifth aspect of the present invention is the three-dimensional measuring device as set forth in the forth aspect, wherein the revising performed by the control device includes: determining whether or not a value of the second height data calculated by the control device at a predetermined position is within a predetermined error range of an average value of the first height data that took into account the line order at a peripheral position of the predetermined position; adopting the first height data that took into account the line order as the second height data of the predetermined position if the value is within the predetermined error range; and adopting the second height data calculated by the control device as the second height data of the predetermined position if the value is not within the predetermined error range.

In the above describe manner, when the value of the second height data of a predetermined position is within a predetermined error range of the average value of the first height data which accounted for the line order at a peripheral position of this predetermined position, it becomes possible to obtain a more accurate value by using the average value of the more accurate first height data which accounted for the line order as the optimum value because the shape at the predetermined position and the adjacent shape are presumed to be comparatively continuous.

On the other hand, when the value of the second height data is not within the error range, using the value of the second height data obtained as actual measurement data calculated by the second calculation means will result in a more accurate value because the shape at the predetermined position and the adjacent shape are presumed to be non-continuous and comparatively rough and severe.

BRIEF DESCRIPTION OF DRAWINGS

FIG. 3 shows a table showing resolution and the like according to each pattern according to an embodiment of the present invention.

FIGS. 4(a) and 4(b) show data arrays of the measured height data according to an embodiment of the present invention.

FIG. 5 shows a data array of the combined first height data and second height data according to an embodiment of the present invention.

FIG. 9 shows a table showing accuracy of various types of height data relative to true values according to an embodiment of the present invention.

FIG. 10 shows a data array of the assembled first through fourth height data according to an embodiment of the present invention.

FIG. 13 shows a table showing accuracy of various types of height data relative to true values according to an embodiment of the present invention.

DETAILED DESCRIPTION

First Embodiment

An embodiment of the present invention is explained below with reference to the attached figures.

Figure 1:
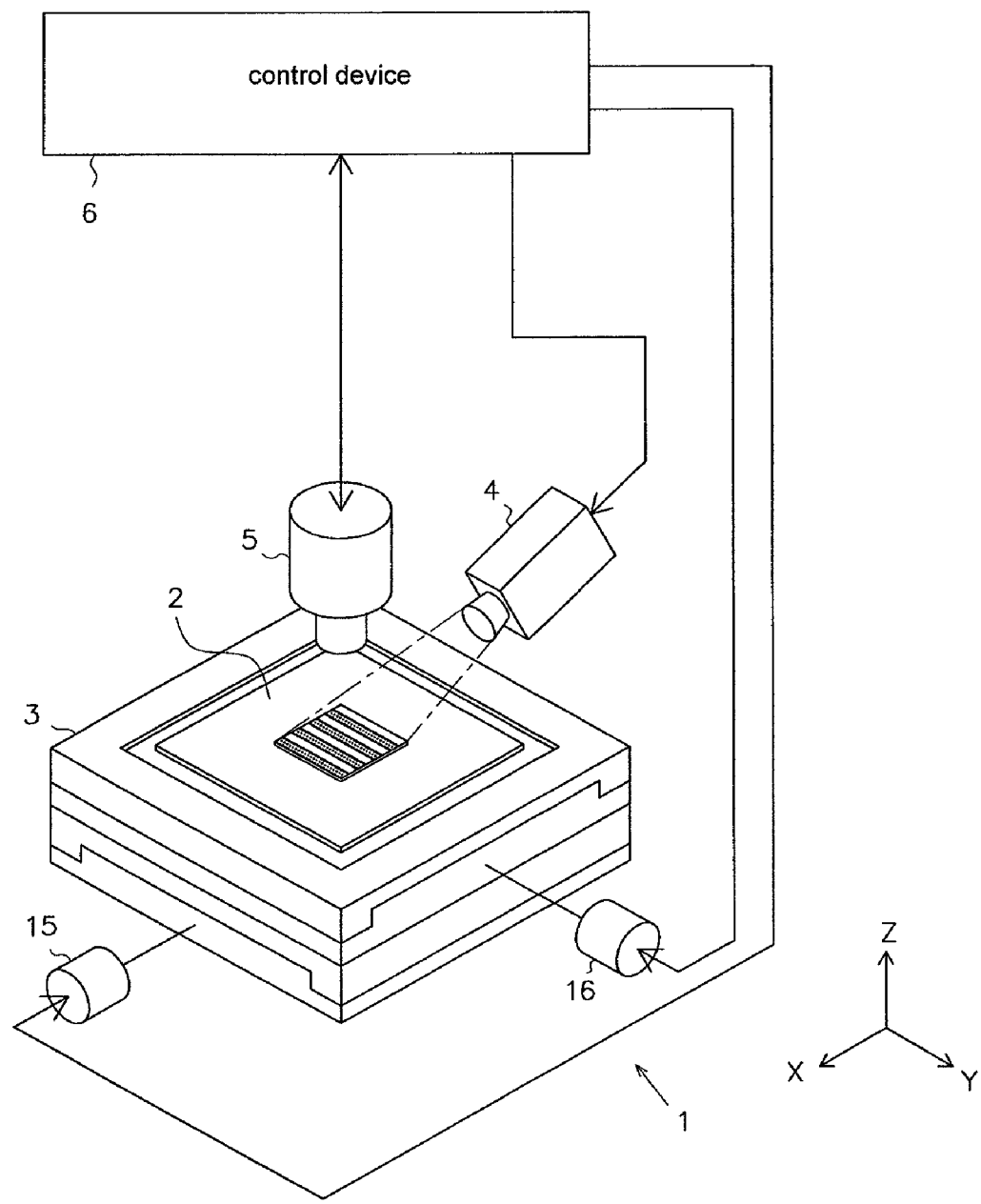
FIG. 1 shows a simplified tilted perspective view showing schematically the board inspection device according to an embodiment of the present invention.

FIG. 1 is a simplified schematic drawing showing a board inspection device 1 equipped with the three-dimensional measuring device of the present embodiment. As shown in FIG. 1, the board inspection device 1 includes the following: a rack 3 for carrying a printed circuit board 2 (the measurement object) printed with cream solder, which is the object of measurement; an irradiation device 4 as an irradiation means for irradiating a certain light pattern from above obliquely onto the surface of the printed circuit board 2; a CCD camera 5 as an imaging means for imaging the above-described irradiated part of the printed circuit board 2; and a control device 6 for performing various types of control, image processing, and calculation processing occurring within the board inspection device 1.

The irradiation device 4 is equipped with a known liquid crystal shutter. The irradiation device 4 is configured so as to be capable of irradiating from an upwardly oblique direction a striped light pattern having a phase that changes every ¼th pitch. In the present embodiment, the light pattern is set so that irradiation occurs along the X-axis direction, which is parallel to a pair of edges of the rectangular shaped printed circuit board 1. Specifically, the lines of the light pattern are irradiated orthogonal to the X-axis direction and parallel to the Y-axis direction.

The irradiation device 4 of the present embodiment is configured so as to be capable of irradiating while switching between two light patterns having different line pitches (periods). More specifically, the irradiation device 4 is capable of switching between a first light pattern having a period of 2 μm and a second light pattern having a period of 4 μn, which is twice as long as the period of the first light pattern. In the present embodiment, 2 μm corresponds to the first period, and 4 μm corresponds to the second period. In this manner, as shown in FIG. 3, for example, the first light pattern can be used with an error range (accuracy) of ±1 (μm) at intervals of "2 (μm)" for measurement of height as "0±1 (μm)," "2±1 (μm)," "4±1 (μm)," etc., within a height range of 0 μm to 10 μm (where 10 μm corresponds to 0 μm of the next line order). On the other hand, the second light pattern can be used with an error range (accuracy) of ±2 (μm) at intervals of "4 (μm)" for measurement of height as "0±2 (μm)," "4±2 (μm)," "8±2 (μm)," etc., within a height range of 0 μm to 20 μm.

Light from a light source (not shown) of the irradiation device 4 is conducted by an optical fiber to a pair of condenser lenses, and this light is collimated by the pair of condenser lenses. This collimated light is transmitted through a liquid crystal element to a projection lens disposed within an isothermal control device. Thereafter, light patterns of four phase variations are irradiated from the projection lens. In this manner, when a striped light pattern is generated by using the liquid crystal optical shutter on the irradiation device 4, light intensity that closely resembles an ideal sine wave is obtained, and, as a result, measurement resolution during three-dimensional measurement is improved. Further, control of phase shift of the pattern light can be performed electrically, and the control system can be made more compact.

The rack 3 is provided with a motor 15 and a motor 16 as displacement means. These motors 15 and 16 are driven and controlled by a control device 6 so that the printed circuit board 2 carried on the rack 3 can be moved in an arbitrary direction (X-axis direction and Y-axis direction).

The CCD camera 5 includes a lens, imaging element, and the like. A CCD sensor can be used as the imaging element. The CCD camera 5 of the present embodiment generates an image that, for example, has an X-axis direction resolution of 512 pixels and a Y-axis direction resolution of 480 pixels.

Electrical configuration of the control device 6 will be explained next.

Figure 2:
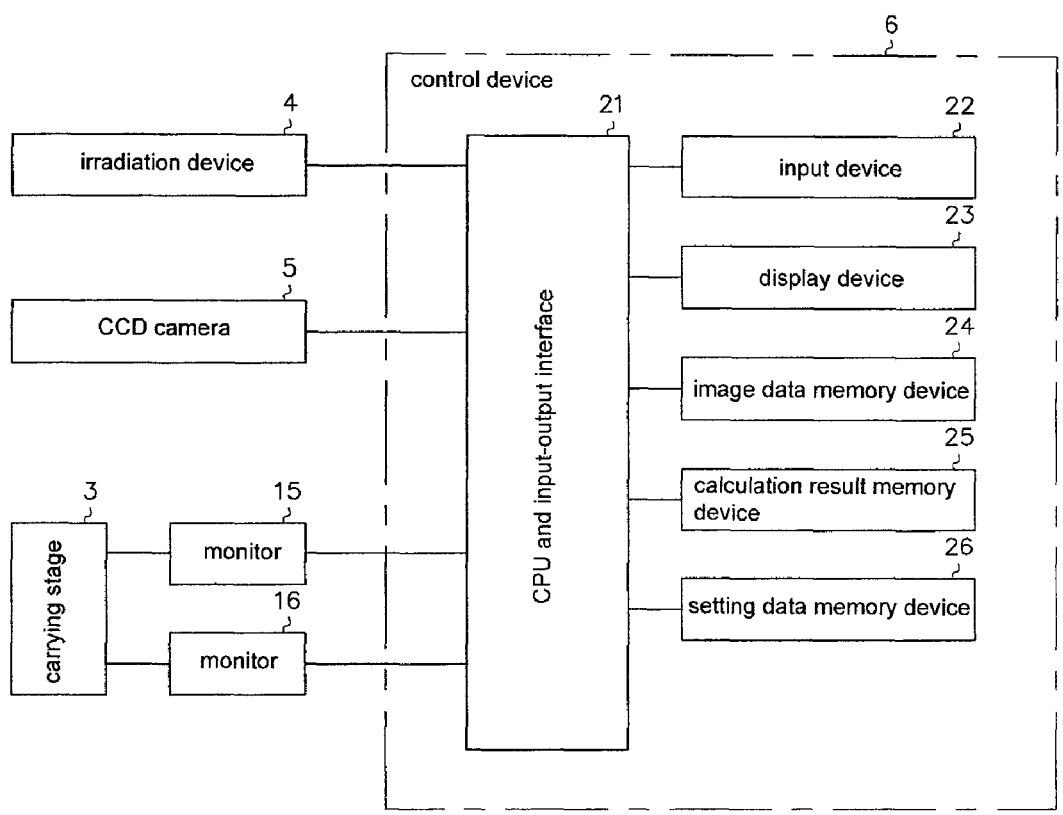
FIG. 2 shows a block diagram showing the electrical configuration of the board inspection device according to an embodiment of the present invention.

As shown in FIG. 2, the control device 6 includes: a CPU and an input-output interface 21 for overall control of the board inspection device 1; an input device 22 as an "input means" including, e.g., a keyboard and mouse or by a touch panel; a display device 23 as a "display means" having a display screen such as a CRT, liquid crystal display, or the like; an image data memory device 24 for storing image data based on an image from the CCD camera 5; a calculation result memory device 25 for storing various types of calculation results; and a setting data memory device 26 for storing beforehand of various types of data. These various devices 22 through 26 are each connected electrically to the CPU and the input-output interface 21.

Details of processing by the control device 6 during three-dimensional measurement will be explained next.

The control device 6 firstly moves the printed circuit board 2 by drive-controlling the motors 15 and 16, and places the field of the CCD camera 5 at the first position of a specific inspection area of the printed circuit board 2. The inspection area is one area among previously partitioned areas of the surface of the printed circuit board, and the inspection area has an area equivalent to one field area unit of the CCD camera 5.

Thereafter, by drive-controlling the irradiation device 4, the control device 6 starts the irradiation of the first light pattern (2 μm=period) and performs sequential switching among four types of irradiation, shifting a phase of the first light pattern in ¼ pitch increments. While irradiation is performed in this manner using the phase-shifted first light pattern, the control device 6 drive-controls of the CCD camera 5, and image data of four images are imaged and obtained for the inspection area part (first position) for each respective irradiation.

The control device 6 performs various types of image processing based on each of the image data of the four obtained images, and based on the known phase shift method explained in the Background of the Invention, height measurement is performed for each coordinate (pixel), and the height measurements are stored as the first height data. This processing is a function of the first calculation means in the present embodiment.

During performance of this processing, the control device 6 drive-controls the motors 15 and 16, causing the printed circuit board 2 to move from the above-described first position by one half pixel pitch in an oblique direction, and places the field of the CCD camera 5 at the second position of the certain inspection area on the printed circuit board 2. Each of the pixels in the present embodiment is square shaped and has edges parallel to the X-axis or Y-axis. Thus, causing movement in a direction oblique with respect to the pixel pitch means that movement is caused in the pixel diagonal line direction over a distance of just one half the distance of the diagonal line of the pixel.

Thereafter, the control device 6 drive-controls the irradiation device 4, initiating irradiation of the second light pattern (period=4 μm) having a period longer than the period of the first light pattern. The control device 6 also performs sequential switching among four types of irradiation, shifting a phase of the second light pattern in ¼ pitch increments. While performing this phase-shifted irradiation by the second light pattern in this manner, the control device 6 further drive-controls CCD camera 5 and causes respective imaging of the inspection area (second position) for each of these irradiations, and four respective images of image data are obtained.

The control device 6 performs various types of image processing based on each of the obtained four images of image data, performs height measurement for each coordinate (pixel) using the phase shift method, and stores results as the second height data. This processing is a function of the second calculation means in the present embodiment.

Thereafter, the control device 6 combines the measurement results at the first position (first height data) and the measurement data at the second position (second height data), and performs image processing to assemble a single measurement result for this inspection area. With such processing, it is possible to obtain measurement data equivalent to measurement data that would have been obtained using an imaging means having four times the resolution of the CCD camera 5. Such image processing will be explained below in detail.

Image processing will be explained here in which the resolution of the CCD camera 5 is, for example, 4×4 pixels per single image field. In this case, data obtained at the first position are stored in memory as shown in FIG. 4(a) for each of the coordinates (pixels) as the first height data A1 through A16. In the same manner, data obtained at the second position are recorded in memory as shown in FIG. 4(b) for each of the coordinates (pixels) as the second height data B1 through B16. FIGS. 4(a) and (b) (and similarly FIGS. 5 through 8) schematically show the data array.

Figure 5:
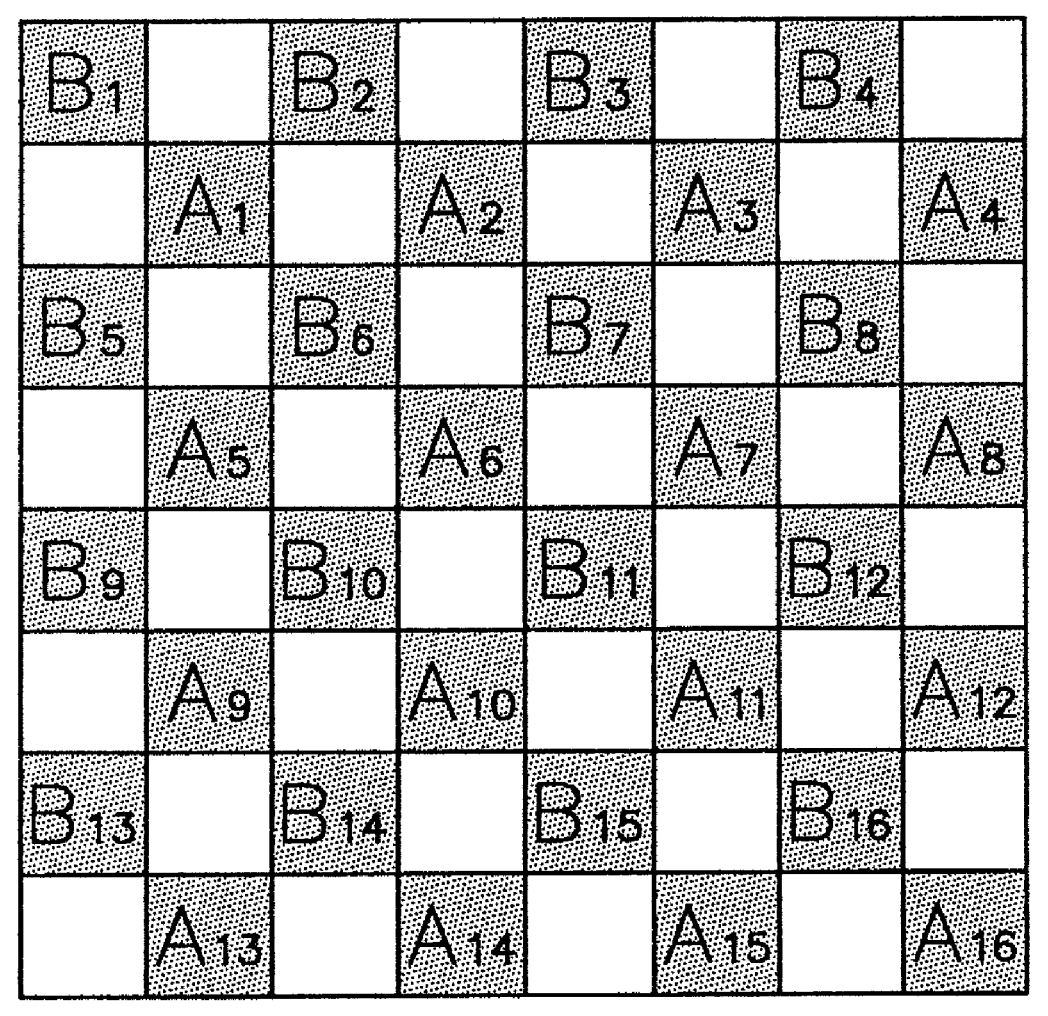

Then, during assembly processing, firstly as shown in FIG. 5, data are generated by arranging the above-described first height data A1 through A16 and the second height data B1 through B16 in a checkerboard pattern on an 8×8 square grid. The empty boxes within FIG. 5 are the missing part of data at this stage. For purposes of better visibility, in FIG. 5 (and similarly for FIGS. 6 through 8), scattered dot pattern shading is applied in a checkerboard pattern.

Thereafter, data replacement processing is performed in which the first height data A1 through A16 are replaced with values that take into account the line order of this first height data A1 through A16. This data replacement processing is a function of the data replacement means in the present embodiment.

Figure 6:
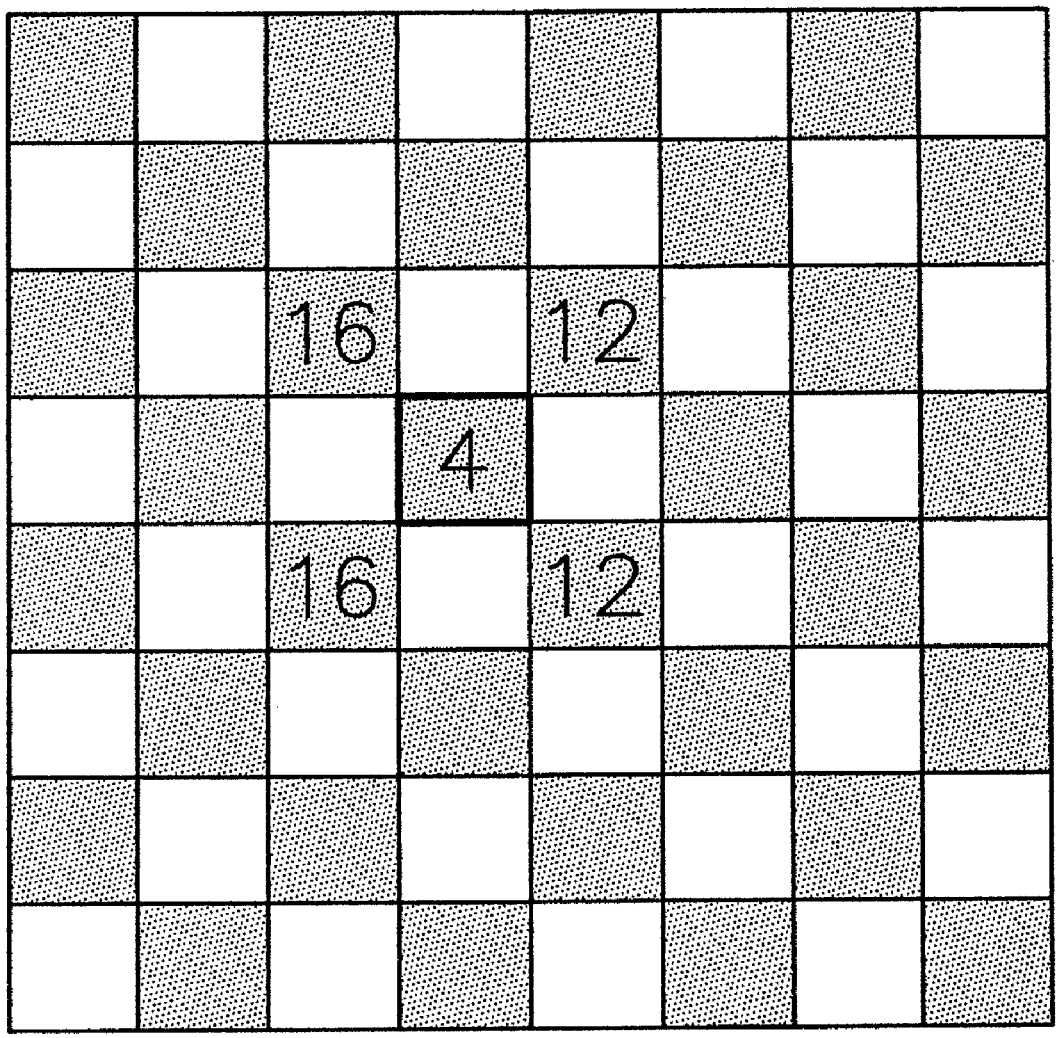
FIG. 6 shows a specific example of data replacement processing according to an embodiment of the present invention.

More specifically, for example, looking at the first height data A6 as shown in FIG. 6, which is surrounded by the thick-bordered box, the recorded value is "4" as obtained by measurement at the first position. The second height data B6, B7, B10, and B11 of the four surrounding adjacent first height data are stored as "16," "12," "16," and "12," respectively. Although the recorded values in FIG. 6 are only these values, each type of height data is stored in memory for other positions in a similar manner as these height data, and the same can be said for FIGS. 7 and 8.

As made clear from the table of FIG. 3, when the value obtained as the first height data is "4 (±1) μm," due to differences in line order, the actual height candidate values for the cream solder (measurement object point) become "4 (1) μm" and "14 (±1) μm." That is to say, when the line order is 1, the actual height is taken to be "4 (±1) μm." When the line order is 2, the actual height is taken to be "14 (±1) μm." For convenience during explanation of the present embodiment, a case is explained in which the height of the cream solder (measurement object point) does not exceed 20 μm.

Thereafter, during data replacement processing by replacement from either of these candidate values "4" and "14," the most appropriate candidate value is selected as the value nearest the average of the second height data B6, B7, B10, and B11 ((16+12+16+12)/4=14) at the periphery of this first height data A6. That is to say, the line order of the phase shift method is determined. Thereafter, the value of the first height data A6 is replaced by the value "14," which takes into account line order. The above-described processing is performed similarly for each of the first height data A1 through A16.

Then, based on the first height data A1 through A16, which took into account the line order, revision processing is performed by revision of the second height data B1 through B16. This data replacement processing is a function of the revision means in the present embodiment.

Figure 7:
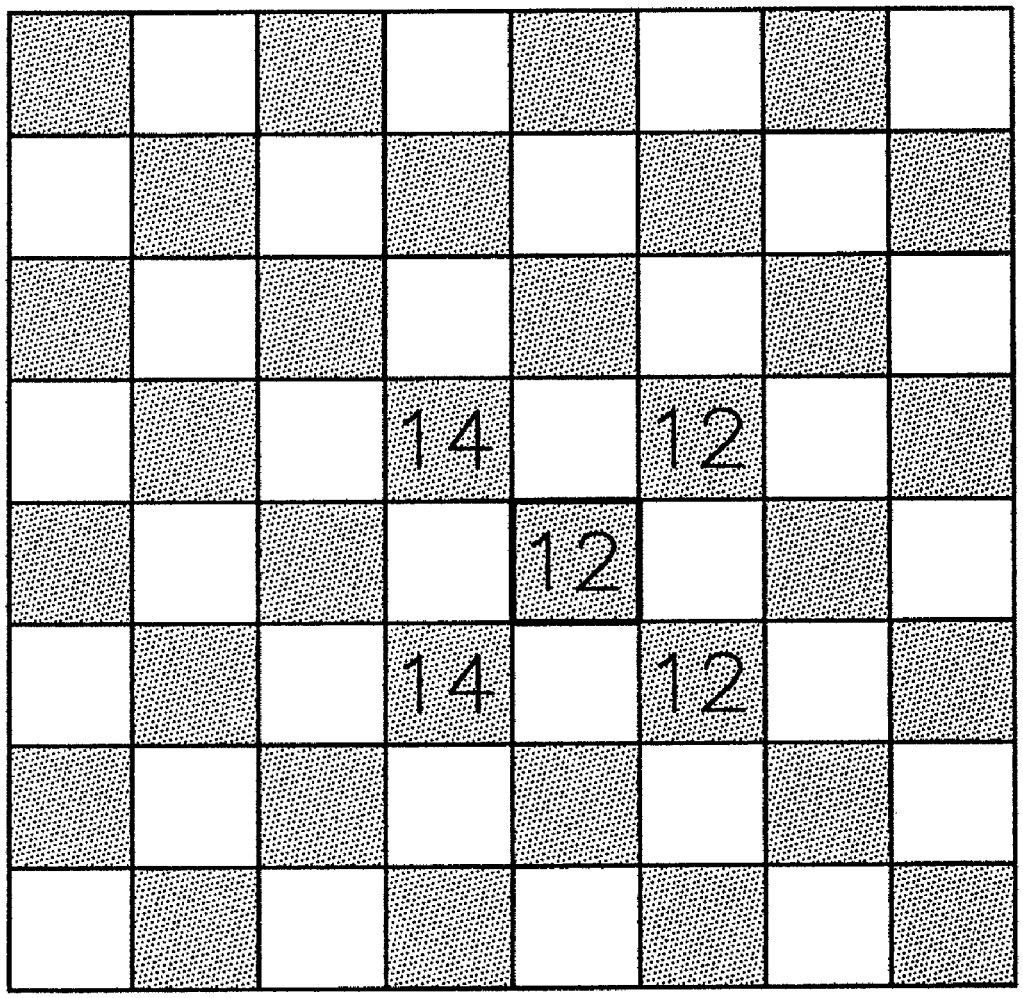
FIG. 7 shows a specific example of revision processing according to an embodiment of the present invention.

More specifically, for example, looking at the second height data B11 as shown in FIG. 7, which is surrounded by the thick-bordered box, the recorded value is "12" as obtained by measurement at the second position. The first height data A6, A7, A10, and A11 of the 4 surrounding and adjacent locations relative to the second height data B11 are stored after the above-described replacement processing as the values "14," "12," "14," and "12," respectively.

Firstly, the average value of these surrounding first height data A6, A7, A10, and A11 is calculated ((14+12+14+12)/4=13). Thereafter, a determination is made as to whether or not the value of the second height data B11 is within an error range of "±2" of this average value.

Then, if this average value is determined to be within the error range of "±2," the cream solder (measurement object point) corresponding to this second height data B11 and the shape in the vicinity of this second height data B11 are presumed to be relatively continuous, and the average value of these first height data A6, A7, A10, and A11 is adopted as the most appropriate value for the second height data B11.

However, if this average value is determined to not be within the error range of "±2," the cream solder (measurement object point) corresponding to this second height data B11 and the shape in the vicinity of this second height data B11 are presumed to have a relatively rough, non-continuous shape, and the non-adjusted second height data B11 (actual data) is adopted as the most appropriate value for the second height data B11.

Thereafter, data interpolation processing is performed to interpolate data of the missing data parts (as shown as empty boxes in FIG. 5). This processing is a function of the interpolation means in the present embodiment.

Figure 8:
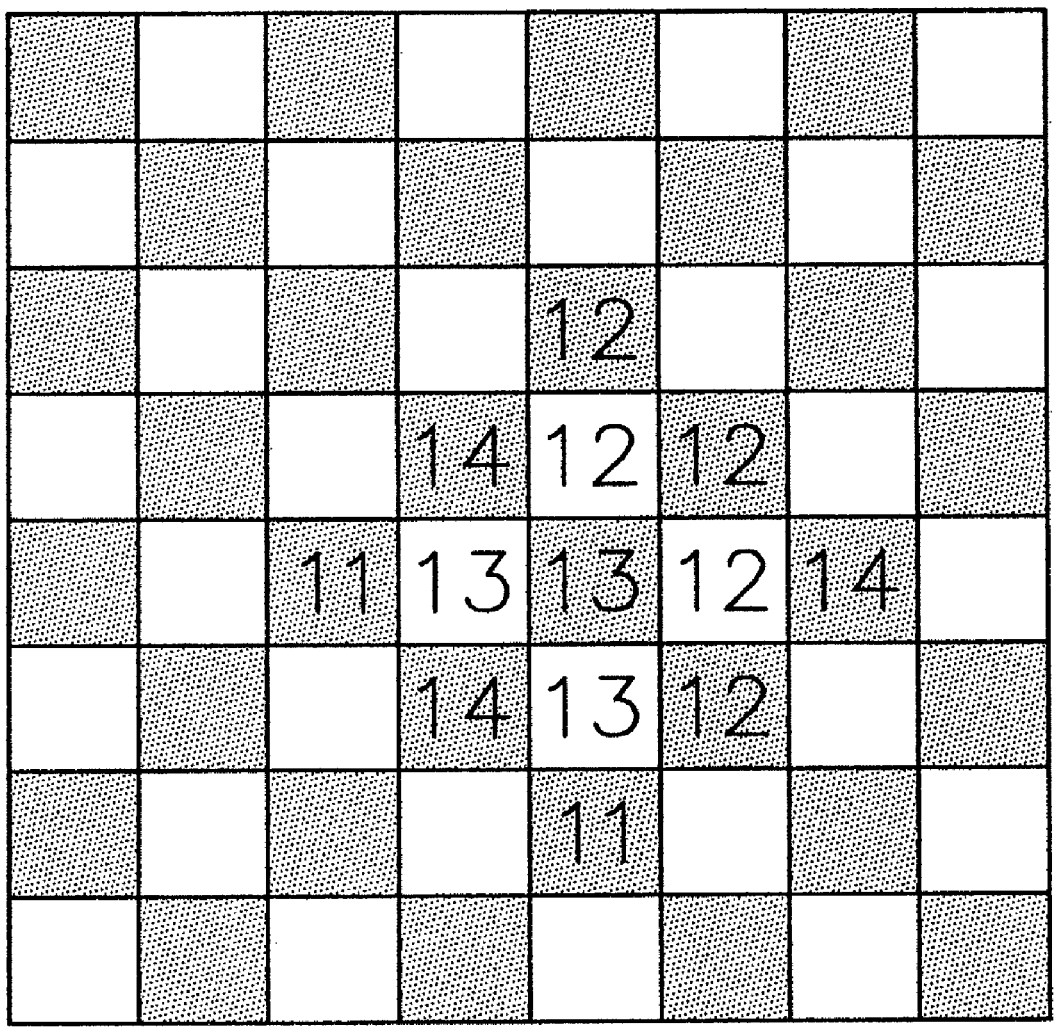
FIG. 8 shows a specific example of interpolation processing according to an embodiment of the present invention.

During data interpolation processing, as shown in FIG. 8 for example, the post-replacement processing first height data A1 through A16 peripheral and adjacent to a certain missing data part are averaged to obtain an average value to be adopted as the interpolation value for this missing data part, or the post-replacement processing second height data B1 through B16 peripheral and adjacent to a certain missing data part are averaged to obtain an average value to be adopted as the interpolation value for this missing data part.

When the above-described sequence of processing is completed, measurement data are completed having an accuracy equivalent to data measurement obtained from imaged imaging data of 8×8 pixels in the entire imaging field (inspection area).

These measurement data for each of the inspection areas obtained in this manner are stored by the calculation result memory device 25 of the control device 6. Thereafter, based on these measurement data for each of the inspection areas, the printing range of the cream solder higher than the standard surface is detected, and by integration of height of each of the parts within this range, the amount of printed cream solder is calculated. Then the position, surface area, height, volume, and the like data for the cream solder determined in this manner are compared with standard data pre-stored in the setting data memory device 26, and depending on whether or not this comparison result is within a permissible range, a determination is made as to whether the printing condition of the cream solder at this inspection area is good or bad.

During performance of this processing, the control device 6 drive-controls the motors 15 and 16, whereby the printed circuit board 2 is moved to the next inspection area. Then, the above-described sequence of processing is repeated for all of the inspection areas.

In this manner, by performing the sequential image processing while shifting the inspection area is via the control device 6, the board inspection device 1 of the present embodiment performs three-dimensional measurement including height measurement of the cream solder on the printed circuit board 2. As a result, the board inspection device 1 of the present embodiment can rapidly and reliably inspect the printed state of the cream solder.

As described in detail previously, in the present embodiment, based on a multiplicity of image data obtained by irradiation on the first position of a first light pattern having a period of 2 μm, height data for each pixel unit of image data are calculated by the phase shift method as the first height data A1 through A16. At the second position displaced obliquely by a half pixel pitch from the first position, the second light pattern having a period of 4 μm is irradiated to obtain a multiplicity of image data, and based on this multiplicity of image data, height data for each pixel unit of image data are calculated by the phase shift method as the second height data B1 through B16. Combining these data makes it possible to generate image data (measurement data) having a resolution that is four times that of the CCD camera 5, and three-dimensional measurement can be carried out with higher accuracy.

Further, according to the present embodiment, based on the second height data B1 through B16 obtained using the second light pattern having a long period, the line orders of each of the first height data A1 through A16 are determined. Thereafter, the values of the first height data A1 through A16 are replaced by compensated values that take into account these line orders. That is to say, the ability to increase the height range capable of measurement, which is an advantage of using the second light pattern having a long period, and the ability to realize highly accurate measurement, which is an advantage of using the first light pattern having a short period, can both be realized. As a result, as shown in FIG. 9, the horizontal resolution is increased, and the range of height capable of measurement is increased without lowering resolution in the height direction.

Moreover, according to the present embodiment, measurement at the first or the second position is performed by irradiating only one of either the first light pattern or the second light pattern. That is to say, because there is no need for respective irradiation and measurement by two types of light patterns at the two locations, it becomes possible to reduce the number of imaging operations as well as the total measurement time. As a result, higher accuracy measurement can be achieved over a shorter time interval.

Because the above configuration can be implemented with image processing, which is software-based processing, it becomes possible to reduce manufacturing costs without modifying hardware.

Further, according to the configuration of the present embodiment, the first height data A1 through A16 after replacement processing for the certain missing data parts disposed at the periphery are calculated, an average value based on each of the data for the post-revision processing second height data B1 through B16 is calculated, and data interpolation processing is performed using the interpolation values for these missing data parts. Therefore, it is possible to prevent missing data parts when generating high resolution data by combining the first data A1 through A16 and the second height data B1 through B16.

Further still, according to the present embodiment, based on the first height data A1 through A16, which have high accuracy due to consideration of the line order, revision processing is performed by revising the second height data B1 through B16. As a result, the values of the second height data B1 through B16 can be set to values that are closer to the real values.

Second Embodiment

A second embodiment of the present invention will be explained next. Duplicates of parts of the above-described first embodiment will be referred to with the same part names and identification numbers. Explanation of such duplicate parts will be omitted, and the explanation below will focus on those parts that differ from the parts of the first embodiment.

According to three-dimensional measurement of the present embodiment, the control device 6 drive-controls the motors 15 and 16 so that the printed circuit board 2 moves and so that the field of the CCD camera 5 can be matched to the first position of a certain inspection area on the printed circuit board 2.

Thereafter, the control device 6 drive-controls the irradiation device 4, initiates the irradiation of the first light pattern (2 μm period), and performs sequential switching control among four types of irradiation, shifting a phase of the first light pattern in ¼ pitch increments. While performing irradiation of the first light pattern of shifting phase in this manner, the control device 6 drive-controls the CCD camera 5, images the inspection area part (first position) for each of the types of irradiation, and obtains image data as four respective images.

The control device 6, based on each of the obtained four images of image data, performs various types of image processing, and based on the known phase shift method explained also in the Background of the Invention, performs height measurement for each of the coordinates (pixels). The control device 6 then stores the height measurements as the first height data.

During the performance of this processing, the control device 6 drive-controls the motors 15 and 16, and causes movement of the printed circuit board 2 obliquely in the X-axis direction to a position displaced one half pixel pitch away from the above-described first position. Thereafter, the control device 6 causes the field of the CCD camera 5 to align with the second position of the certain inspection area on the printed circuit board 2.

Thereafter, the control device 6 drive-controls the irradiation device 4, initiates the irradiation of the second light pattern (4 μm period) having a period longer than the period of the first light pattern, and performs sequential switching control among four types of irradiation, shifting a phase of the first light pattern in ¼ pitch increments. Further, the control device 6, while performing irradiation of the second light pattern of shifting phase in this manner, drive-controls the CCD camera 5, images the inspection area part (second position) for each of the types of irradiations, and obtains image data as four respective images.

The control device 6, based on each of the obtained four images of image data, performs various types of image processing, and based on the phase shift method, performs height measurement for each of the coordinates (pixels). The control device 6 then stores the height measurements as the second height data.

During the performance of this processing, the control device 6 drive-controls the motors 15 and 16, and causes movement of the printed circuit board 2 obliquely in the X-axis direction to a position displaced one half pixel pitch away from the above-described first position. Thereafter, the control device 6 causes the field of the CCD camera 5 to align with a third position of the certain inspection area on the printed circuit board 2.

Thereafter, the control device 6 drive-controls the irradiation device 4, initiating irradiation of the first light pattern (2 μm period), and performs sequential switching control among four types of irradiation, shifting a phase of the first light pattern in ¼ pitch increments. Further, the control device 6, while performing irradiation of the first light pattern of shifting phase in this manner, drive-controls the CCD camera 5, images the inspection area part (third position) for each of the types of irradiations, and obtains image data as four respective images.

The control device 6, based on each of the obtained four images of image data, performs various types of image processing, and based on the phase shift method, performs height measurement for each of the coordinates (pixels). The control device 6 then stores the height measurements as the third height data.

During the performance of this processing, the control device 6 drive-controls the motors 15 and 16, and causes movement of the printed circuit board 2 obliquely in the X-axis direction to a position displaced one half pixel pitch away from the above-described first position. Thereafter, the control device 6 causes the field of the CCD camera 5 to align with the forth position of the certain inspection area on the printed circuit board 2.

Thereafter, the control device 6 drive-controls the irradiation device 4, initiating irradiation of the second light pattern (4 μm period), and performs sequential switching control among four types of irradiation, shifting a phase of the first light pattern in ¼ pitch increments. Further, the control device 6, while performing irradiation of the second light pattern of shifting phase in this manner, drive-controls the CCD camera 5, images the inspection area part (forth position) for each of the types of irradiations, and obtains image data as four respective images.

The control device 6, based on each of the obtained four images of image data, performs various types of image processing, and based on the phase shift method, performs height measurement for each of the coordinates (pixels). The control device 6 then stores the height measurements as the forth height data.

Thereafter, the control device 6 combines the measurement results at the first position (first height data), the measurement results at the second position (second height data), the measurement results at the third position (third height data), and the measurement results at the forth position (forth height data). Image processing is performed by combining these measurement results as a single measurement result for this inspection area. This image processing will be explained below in detail.

Image processing will be explained here in which the resolution of the CCD camera 5 is, for example, of 4×4 pixels per one imaging field.

Figure 10:
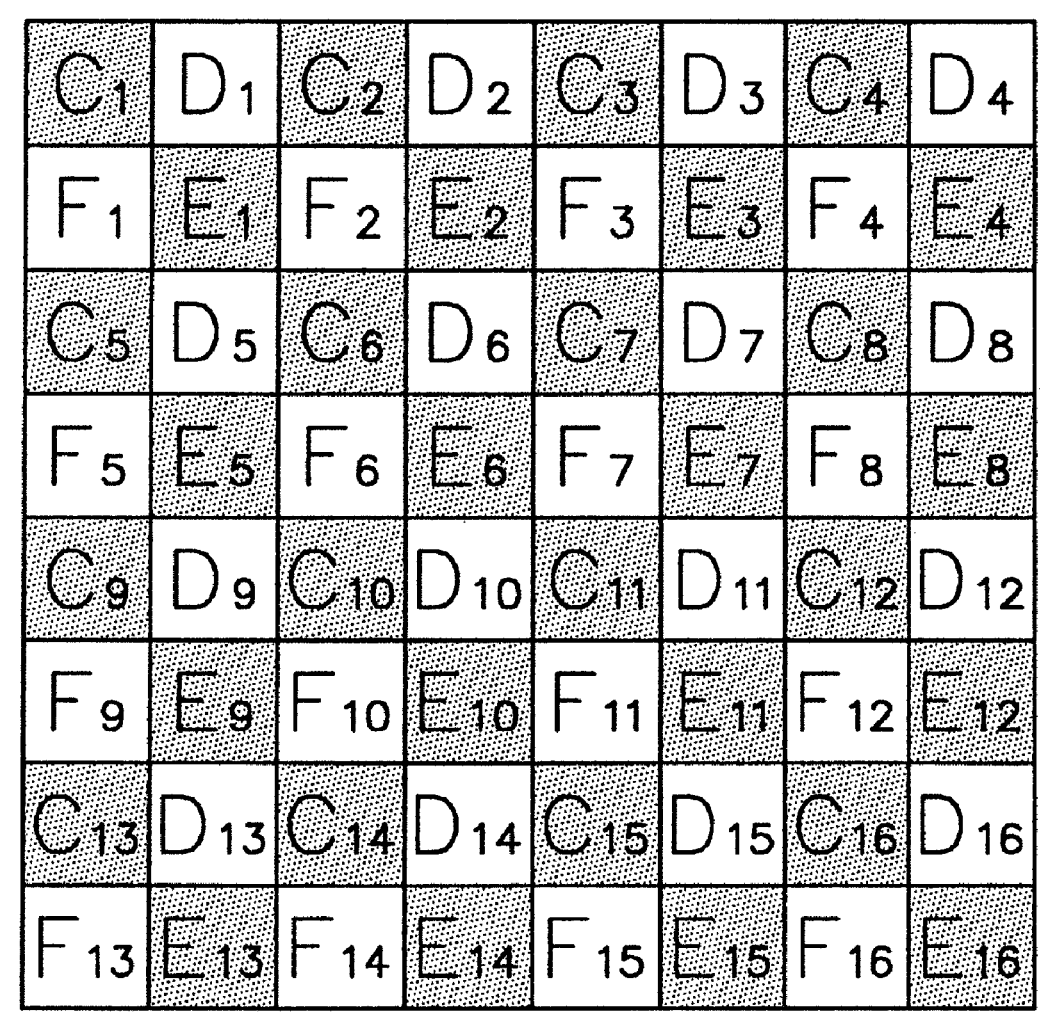

During assembly processing in this case, firstly as shown in FIG. 10, the first height data C1 through C16, the second height data D1 through D16, the third height data E1 through E16, and the forth height data F1 through F16 for each pixel obtained at each of the first through forth positions are arranged to produce data in an 8×8 grid. For purposes of better visibility, in FIG. 10 (and similarly for FIGS. 11 and 12), a scattered dot shading is applied in a checkerboard pattern.

Thereafter, data replacement processing is performed in which the first height data C1 through C16 and the third height data E1 through E16 are replaced with such first height data C1 through C16 and the third height data E1 through E16, respectively, taking into account the line orders.

Figure 11:
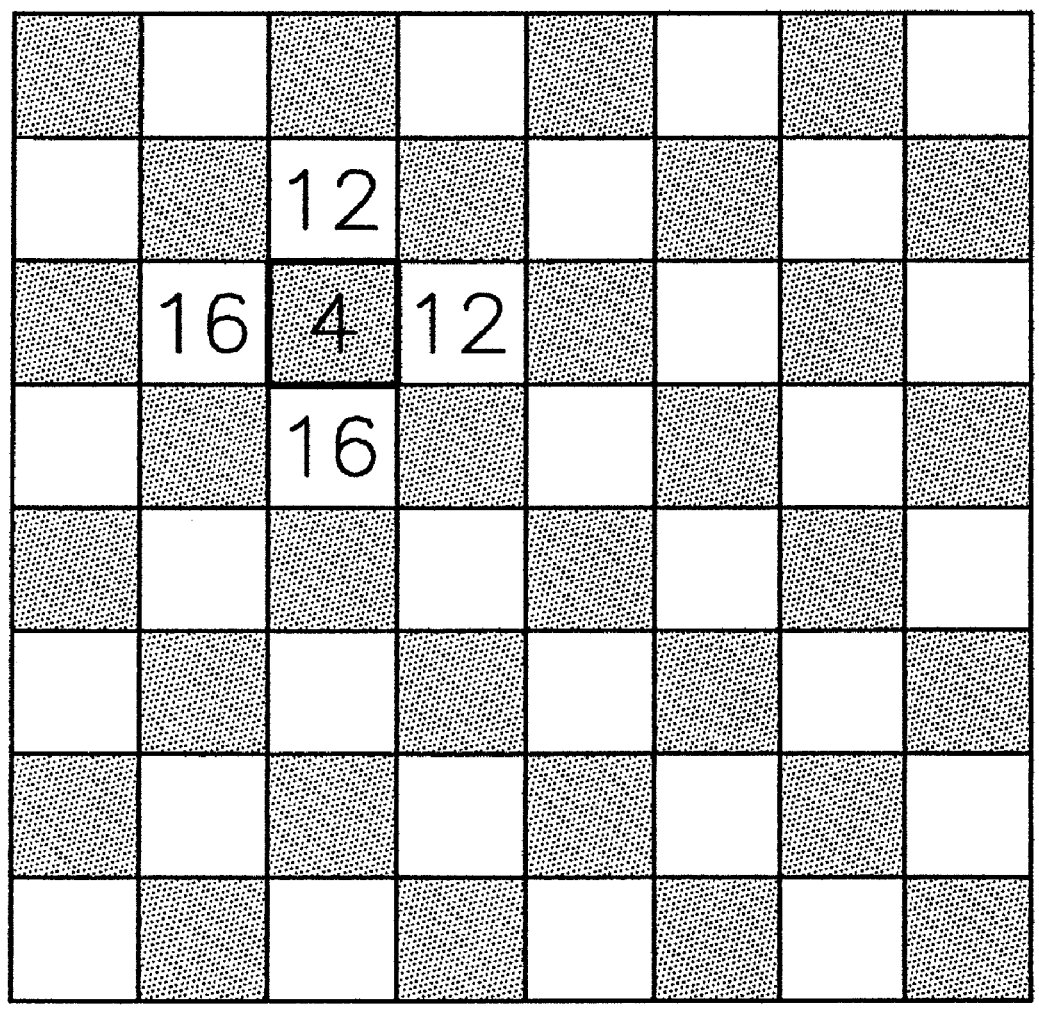
FIG. 11 shows a specific example of data replacement processing according to an embodiment of the present invention.

More specifically, for example, looking at the first height data C6 as shown in FIG. 11, which is surrounded by the thick-bordered box, the recorded value is "4" as obtained by measurement at the first position. The second height data D5 and D6 and the forth height data F2 and F6 surrounding and adjacent to the first height data C6 are stored as "16," "12," "12," and "16," respectively. Although the recorded values in FIG. 11 are only these values, each type of height data is stored in memory for other positions in a similar manner as these height data, and the same can be said for FIG. 12.

In the same manner as the above-described embodiment, when the value obtained as the first height data is "4 (±1) μm," due to differences in line order, the actual height candidate values for cream solder (measurement object point) become "4 (±1) μm" and "14 (±1) μm." That is to say, when the line order is 1, the actual height is taken to be "4 (±1) μm." When the line order is 2, the actual height is taken to be "14 (±1) μm."

Thereafter, during data replacement processing by replacement from either of these candidate values "4" and "14," the most appropriate candidate value is selected as the value nearest the average of the second height data D5 and D6 and the forth height data F2 and F6 ((16+12+12+16)/4=14) at the periphery of this first height data C6. That is to say, the line order of the phase shift method is determined. Thereafter, the value of the first height data C6 is replaced by the value "14," which takes into account line order. The above-described processing is performed similarly for each of the first height data C1 through C16 and the third height data E1 through E16.

Thereafter, based on these first height data C1 through C16 and third height data E1 through E16, which take into account the line order, revision processing is performed by revision of the second height data D1 through D16 and the forth height data F1 through F16.

Figure 12:
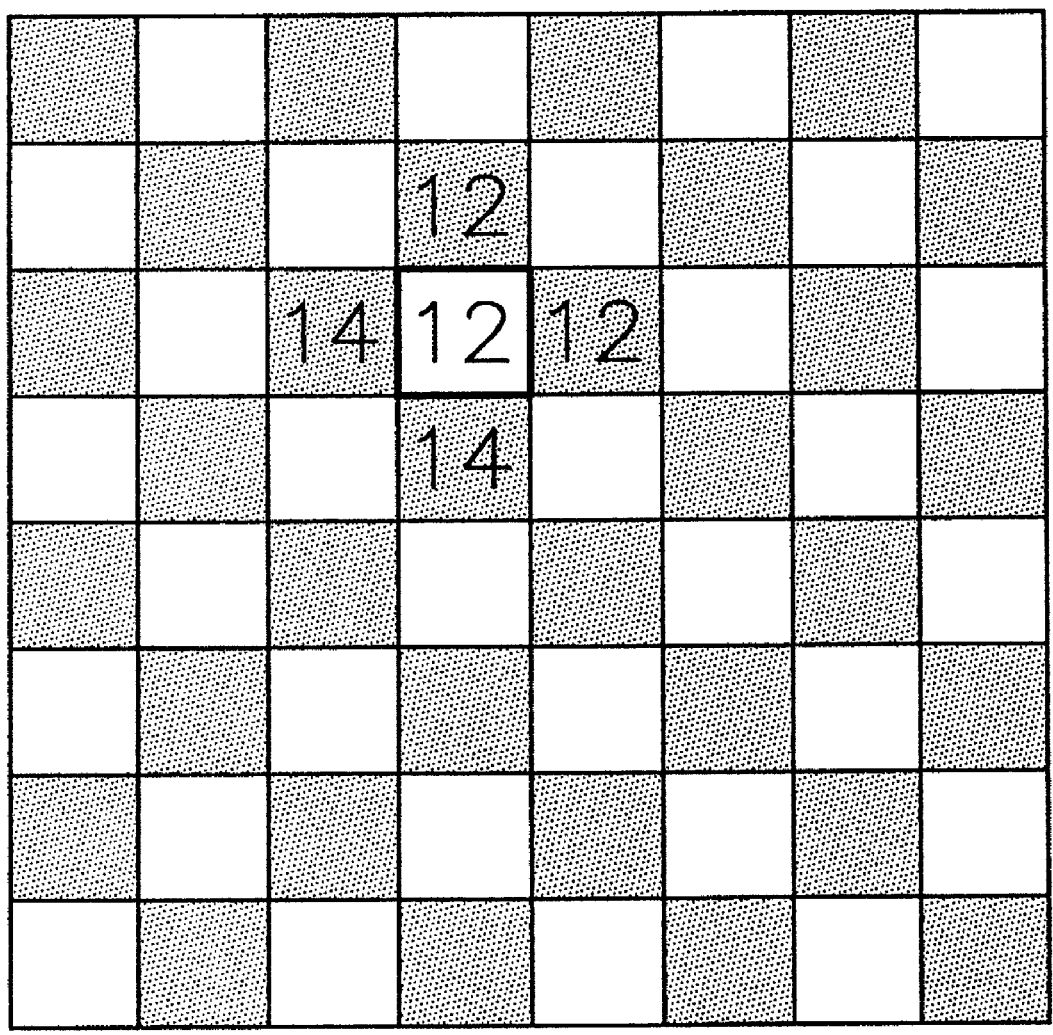
FIG. 12 shows a specific example of revision processing according to an embodiment of the present invention.

More specifically, for example, looking at the second height data D6 as shown in FIG. 12, which is surrounded by the thick-bordered box, the recorded value is "12" as obtained by measurement at the second position. The first height data C6 and C7 and third height data E2 and E6 at surrounding and adjacent locations relative to the second height data D6 are stored after the above-described replacement processing as the values "14," "12," "12," and "14," respectively.

Firstly, the average value ((14+12+12+14)/4=13) of these 4 surrounding first height data C6 and C7 and third height data E2 and E6 is calculated. Then, a determination is made as to whether or not this average value is within the error range of "±2" of the second height data D6.

Then, if it is determined that second height data D6 is within this "+2" error range, in the same manner as in the above-described first embodiment, the average value of the first height data C6 and C7 and third height data E2 and E6 is adopted as the most appropriate value for the second height data D6.

On the other hand, if it is determined that the second height data D6 is not within this "±2" error range, in the same manner as in the above-described first embodiment, the second height data D6 (actual measured data) is adopted without modification as the most appropriate value for the second height data D6.

When the above-described sequence of processing is completed, over the entire imaging field (inspection area), measurement data are completed which have an accuracy equivalent to that of measurement data obtained from imaged image data of 8×8 pixels.

As explained above in detail, the present embodiment has an operational effect similar to that of the above-described first embodiment. That is to say, as shown in FIG. 13, in addition to increasing the horizontal resolution, the height range capable of measurement can be expanded without lowering the resolution in the height direction. In the present embodiment, since there is no problem of missing data parts during the combining of each height data to generate the high resolution data, there is no need for performing data interpolation processing for interpolation of data. As a result, measurement data closer to the actual values can be obtained.

The present invention is not limited to the written details of the each of the above-described embodiments. For example, one or more embodiments of the present invention can be implemented in the following manners.

In each of the above-described embodiments, the three-dimensional measuring device was embodied by the board inspection device 1 for measurement of height of cream solder printed and formed on the printed circuit board 2. However, such embodiments are not limiting, and, for example, the three-dimensional measuring device may be embodied by a structure for measurement of height of solder bumps printed on a board, electronic components and the like mounted on a board, or the like.

(b) In each of the above-described embodiments, examples are presented where a first light pattern having a period of 2 μm and a second light pattern having a period of 4 μm are combined, and cream solder (the measurement object part) is measured up to a height of 20 μm. However, the three-dimensional measuring device, is not limited to any particular light pattern periods or measurement range. For example, a configuration is possible where the period of the second light pattern is lengthened (e.g., to greater than or equal to 6 μm), and the line order of the first light pattern is greater than or equal to 3.

(c) Each of the above-described embodiments is configured so that the positional relationship between the CCD camera 5 (imaging element) and the printed circuit board 2 (measurement object) is changed by relative displacement by moving the printed circuit board 2 carried on the rack 3. However, the three-dimensional measuring device is not limited to this configuration, and a configuration is possible, for example, which causes relative displacement of both components by moving only the CCD camera 5.

(d) Although in each of the above-described embodiments, a CCD sensor (CCD camera 5) is adopted as the imaging element (imaging means), the imaging element is not limited to this CCD sensor. For example, a CMOS sensor or the like can be used as the imaging element.

Moreover, the CCD camera 5 of each of the above-described embodiments has a resolution of 512 pixels in the X-axis direction and 480 pixels in the Y-axis direction. However, the CCD camera 5 is not limited to this particular resolution. The present invention is effective also for a system that has a lower or higher resolution.

(e) The procedure of revision processing of the second height data, etc. and the procedure of interpolation processing of the missing data part are not limited to the order described in each of the above mentioned embodiments, and a configuration may be adopted that performs such processing by another procedure.

DESCRIPTION OF REFERENCE NUMERALS

1 . . . board inspection device
2 . . . printed circuit board
4 . . . irradiation device
5 . . . CCD camera
6 . . . control device
15, 16 . . . motor
A1 through A16 . . . first height data
B1 through B16 . . . second height data
What is claimed is:
1. A three-dimensional measuring device comprising:
an irradiation means capable of irradiating and switching among a multiplicity of light patterns having different periods and having a striped light intensity distribution on at least a measurement object;

an imaging means having an imaging element capable of imaging reflected light from the measurement object irradiated by the light pattern;

a displacement means for causing relative change in positional relationship between the imaging element and the measurement object; and an image processing means for performing three-dimensional measurement based on image data imaged by the imaging means, wherein the image processing means comprises:

a first calculation means for performing a phase shift method calculation of height data as a first height data for each pixel unit of image data based on a multiply phase-shifted image data obtained by irradiating on a first position a multiply phase-shifted first light pattern having a first period;

a second calculation means for performing a phase shift method calculation of height data as a second height data for each pixel unit of image data based on a multiply phase-shifted image data obtained by irradiating on a second position a multiply phase-shifted second light pattern having a second period, the second period being longer than the first period, and the second position being displaced by a half pixel pitch toward a predetermined direction from the first position; and a data replacement means for replacing the first height data, after identifying a line order of each of the first height data based on the second height data, with a value that took into account the identified line order.

2. The three-dimensional measuring device as set forth in claim 1, wherein the second position is a position displaced obliquely a half pixel pitch from the first position.

3. The three-dimensional measuring device as set forth in claim 2, further comprising an interpolation means for interpolating a missing data part based on the first height data that took into account at least the line order at the periphery of the missing data part.

4. The three-dimensional measuring device as set forth in claim 1, further comprising a revision means for revising the value of the second height data based on the first height data that took into account the line order.

5. The three-dimensional measuring device as set forth in claim 4, wherein the revision means:

determines whether or not a value of the second height data calculated by the second calculation means at a predetermined position is within a predetermined error range of an average value of the first height data that took into account the line order at a peripheral position of the predetermined position;

adopts the first height data that took into account the line order as the second height data of the predetermined position if the value is within the predetermined error range; and adopts the second height data calculated by the second calculation means as the second height data of the predetermined position if the value is not within the predetermined error range.

6. A three-dimensional measuring device comprising:

an irradiation device configured to irradiate and switch among a multiplicity of light patterns having different periods and having a striped light intensity distribution on at least a measurement object;

a camera having an imaging element capable of imaging reflected light from the measurement object irradiated by the light pattern;

a rack configured to cause relative change in positional relationship between the imaging element and the measurement object; and a control device configured to perform three-dimensional measurements based on image data imaged by the camera, wherein the control device performs the three-dimensional measurements by:

performing a phase shift method calculation of height data as a first height data for each pixel unit of image data based on a multiply phase-shifted image data obtained by irradiating on a first position a multiply phase-shifted first light pattern having a first period;

performing a phase shift method calculation of height data as a second height data for each pixel unit of image data based on a multiply phase-shifted image data obtained by irradiating on a second position a multiply phase-shifted second light pattern having a second period, the second period being longer than the first period, and the second position being displaced by a half pixel pitch toward a predetermined direction from the first position; and replacing the first height data, after identifying a line order of each of the first height data based on the second height data, with a value that took into account the identified line order.

7. The three-dimensional measuring device as set forth in claim 6, wherein the second position is a position displaced obliquely a half pixel pitch from the first position.

8. The three-dimensional measuring device as set forth in claim 7, wherein the control device further interpolates a missing data part based on the first height data that took into account at least the line order at the periphery of the missing data part.

9. The three-dimensional measuring device as set forth in any one of claim 6, wherein the control device further revises the value of the second height data based on the first height data that took into account the line order.

10. The three-dimensional measuring device as set forth in claim 9, wherein the revising performed by the control device comprises:

determining whether or not a value of the second height data calculated by the control device at a predetermined position is within a predetermined error range of an average value of the first height data that took into account the line order at a peripheral position of the predetermined position;

adopting the first height data that took into account the line order as the second height data of the predetermined position if the value is within the predetermined error range; and adopting the second height data calculated by the control device as the second height data of the predetermined position if the value is not within the predetermined error range.

11. A method for performing a three-dimensional measurement, the method comprising:

irradiating and switching among a multiplicity of light patterns having different periods and having a striped light intensity distribution on at least a measurement object;

imaging reflected light from the measurement object irradiated by the light pattern;

causing relative change in positional relationship between an imaging element and the measurement object;

performing a phase shift method calculation of height data as a first height data for each pixel unit of image data based on a multiply phase-shifted image data obtained by irradiating on a first position a multiply phase-shifted first light pattern having a first period;

performing a phase shift method calculation of height data as a second height data for each pixel unit of image data based on a multiply phase-shifted image data obtained by irradiating on a second position a multiply phase-shifted second light pattern having a second period, the second period being longer than the first period, and the second position being displaced by a half pixel pitch toward a predetermined direction from the first position; and replacing the first height data, after identifying a line order of each of the first height data based on the second height data, with a value that took into account the identified line order.

12. The method as set forth in claim 11, wherein the second position is a position displaced obliquely a half pixel pitch from the first position.

13. The method as set forth in claim 12, further comprising interpolating a missing data part based on the first height data that took into account at least the line order at the periphery of the missing data part.

14. The method as set forth in any one of claim 11, further comprising revising the value of the second height data based on the first height data that took into account the line order.

15. The method as set forth in claim 14, wherein the revising comprises:

determining whether or not a value of the second height data calculated at a predetermined position is within a predetermined error range of an average value of the first height data that took into account the line order at a peripheral position of the predetermined position;

adopting the first height data that took into account the line order as the second height data of the predetermined position if the value is within the predetermined error range; and adopting the second height data calculated as the second height data of the predetermined position if the value is not within the predetermined error range.

* * * * *